Schurger & Allstatter.
Harvester Rake.
N° 80879         Patented Aug. 11, 1868.

Witnesses
Theo Fusche
W. Trewin

Inventors
J. Schurger
A. Allstatter
Per Munn & Co.
Attorneys

United States Patent Office.

FRANK SCHURGER AND NICHOLAS ALLSTATTER, OF HAMILTON, OHIO.

Letters Patent No. 80,879, dated August 11, 1868.

IMPROVEMENT IN HARVESTER-RAKES.

*The Schedule referred to in these Letters Patent and making part of the same.*

TO ALL WHOM IT MAY CONCERN:

Be it known that we, FRANK SCHURGER and NICHOLAS ALLSTATTER, of Hamilton, in the county of Butler, and State of Ohio, have invented a new and improved Self-Rake and Reel for Harvesters; and we do hereby declare that the following is a full, clear, and exact description thereof, which will enable others skilled in the art to make and use the same, reference being had to the accompanying drawings, forming part of this specification, in which—

Figure 1:
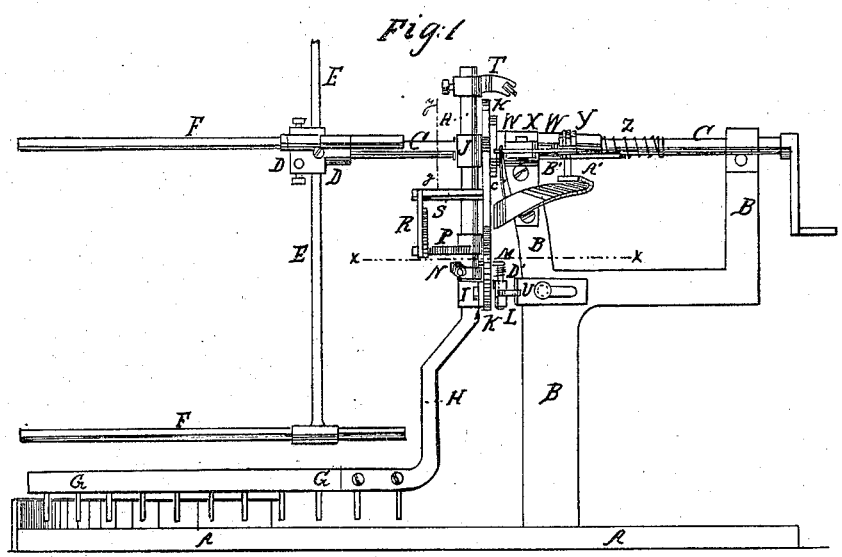
Figure 3:
Figure 4:
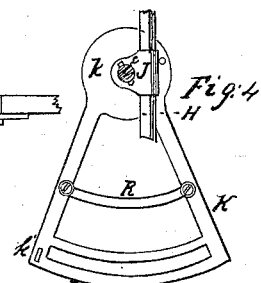
Figure 2:
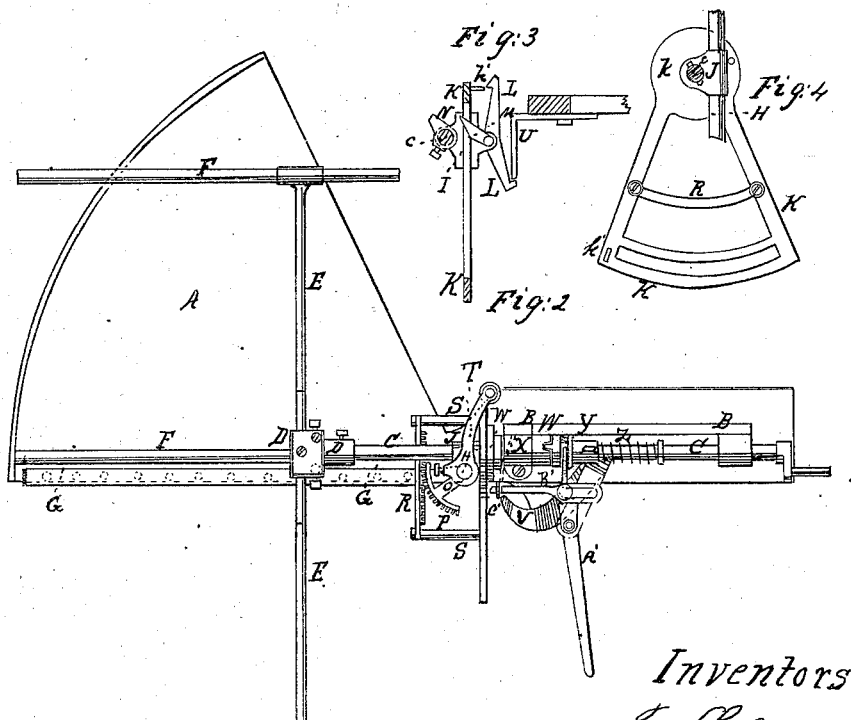

Figure 1 is a side view of our improved device.
Figure 2 is a top view of the same.
Figure 3 is a detail sectional view, taken through the line $x\,x$, fig. 1.
Figure 4 is a detail sectional view, taken through the line $y\,y$, fig. 1.
Similar letters of reference indicate like parts.

A represents the platform, and
B represents a part of the frame of the harvester.
C is the shaft from which the reel and rake are suspended, and by the motion of which they are operated.
D is a head, securely attached to the end of the shaft C, for the reception of the arms of the reel.
E are the arms of the reel, upon the outer ends of which are formed sockets for the reception of the bars F, and the inner ends of which pass through holes in the head D, where they are secured in place by set-screws, as shown in figs. 1 and 2, so that they may be adjusted as required.
G is the rake-head, to the inner end of which is attached a shaft, H, which passes up through and works in the bearings I and J.
The bearing I slides back and forth in a curved slot formed in the frame or quadrant K, and the bearing J rides upon the shaft C.
To the rear side of the bearing I is pivoted a double catch, L, as shown in fig. 3, the pivoting-arm of which has a projecting finger, M, rigidly attached to its upper end.
N is a finger attached to the shaft H, just above the bearing I, as shown in fig. 1.
O is an arm attached to the shaft H, and having a curved rack, P, attached to its outer end, the teeth of which mesh into the teeth of the curved rack R, connected to the frame or quadrant K by the arms S.
To the upper end of the shaft H is attached an arm, T, having a friction-wheel pivoted to its outer end, as shown in figs. 1 and 2.
U is a stop-plate, adjustably attached to the frame B.
V is a curved guide-plate, attached to the frame B.
The frame or quadrant K is attached to a sleeve or collar, W, which turns loosely upon the shaft C and in the bearing X of said shaft C.
In the end of the sleeve W are formed notches, to enable the clutch Y to take hold of it, so as to carry the collar or sleeve, and its attachments, with the shaft C, in its revolution.
The clutch Y is held forward against the sleeve W by the spring Z, coiled around the shaft C, and pressing against the said clutch.
The clutch Y is moved away from the sleeve W by the lever A', the forked end of which rides in a groove in the said clutch.
B' is an arm pivoted to the lever A', and having a slot formed in it, which works upon the pivoting-pin of the said lever A'.
The end of the arm B' passes through a hole in the guide-arm C' in such a position as to enter a hole formed in the frame K, and lock the said frame, holding the rake stationary, while the reel continues to operate. The said hole is formed in such a part of the frame K that the arm B' can enter it only when the rake is in one position, that is to say, just after the rake has left the platform.
This device is needed only in light grain, where, at a single revolution of the reel, enough grain will not be cut to form a sheaf.

In using the machine, the parts being in the position shown in figs. 1 and 2, as the shaft C revolves, the catch takes hold of the stop-plate, and holds the sliding bearing stationary, and as the quadrant or frame K advances, the toothed racks P and R, acting upon each other, partially revolving the rake-shaft H, bringing the finger N into contact with the finger M, thus releasing the catch L, and allowing the rake to move on with the reel. As the rake passes over the shaft C, the friction-wheel of the arm T comes in contact with the curved guide-plate V, revolving the rake-shaft H back, so as to bring the rake-head parallel with the bars F of the reel, releasing the finger M from the finger N, and allowing the spring D' to bring the catch into such a position that it will take hold of the stop K', and hold the frame K and rake-head relatively stationary until the catch again catches upon the stop-plate U.

What we claim as new, and desire to secure by Letters Patent, is—

1. The combination of the catch L, sliding bearing I, and frame or quadrant K, with each other and with the stop U, rake-shaft H, and shaft C, substantially as herein shown and described, for the purpose of preventing any motion of the said shaft H but one revolution on its axis while the rake-head is sweeping over the platform.

2. The combination of the curved racks P and R with each other and with the frame K and rake-shaft H, substantially as herein shown and described, for the purpose of partially rotating the shaft H, and causing the rake-head to sweep over the platform.

3. The combination of the fingers N and M with each other and with the shaft H and catch L, substantially as herein shown and described, for the purpose of releasing the catch L from the stop U at the proper time.

4. The combination of the clutch Y, lever A', and arm B', with each other and with the shaft C, collar or sleeve W, and frame or quadrant K, substantially as herein shown and described, and for the purpose set forth.

FRANK SCHURGER,
NICHOLAS ALLSTATTER.

Witnesses:
 JOHN WAGNER,
 F. ELSER.